United States Patent Office.

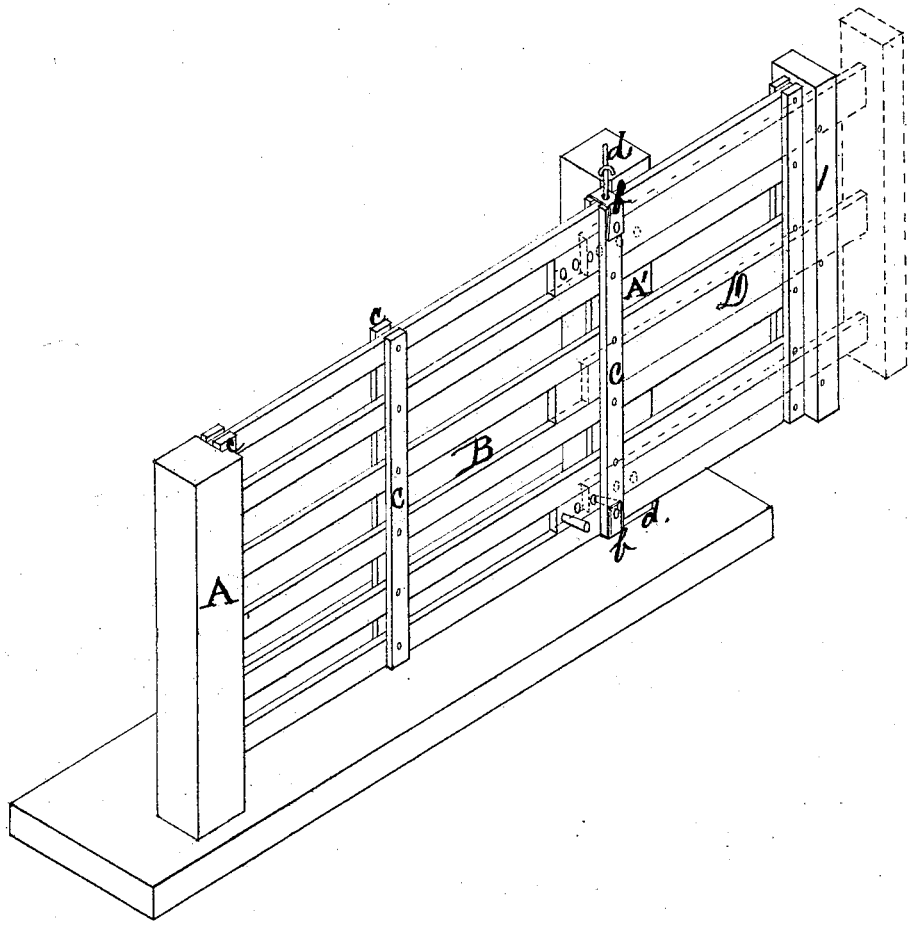

GERSHOM MOTT, JOSHUA MORRIS, JR., AND DAVID LUPTON, OF BIG RUN, OHIO.

Letters Patent No. 94,764, dated September 14, 1869.

IMPROVEMENT IN GATES.

The Schedule referred to in these Letters Patent and making part of the same.

*To all whom it may concern:*

Be it known that we, GERSHOM MOTT, JOSHUA MORRIS, JR., and DAVID LUPTON, of Big Bun, in the county of Athens, and State of Ohio, have invented certain new and useful Improvements in Gates; and we do hereby declare that the following is a full, clear, and exact description thereof, reference being had to the accompanying drawings, and to the letters of reference marked thereon, which form part of this specification, and in which is represented a perspective view of our gate.

Our invention relates to improvements in gates; and to this end,

It consists in the peculiar manner of hanging the gate at or near the centre.

It further consists in the employment of an adjustable piece on one end of the gate, substantially in the manner and for the purpose hereinafter described.

To enable others to make and use our invention, we will now describe its construction and operation.

In the accompanying drawing—

A A' represent the posts, secured in the ground in the usual manner, and at proper distances apart.

The post A is cut out at $a$, to receive the end of the gate.

B represents the gate, consisting of parallel bars, secured together by the perpendicular bars $c\ c$, which are placed on each side of the parallel bars, opposite to each other.

One of the perpendicular bars $c$—that is, the one nearest the centre—is provided with the metal plate $b$ at each end, secured to the bar, as seen in the drawing, and formed with a hole in the centre.

Through this hole are inserted the rods $d\ d$, and bent so as to form right angles with the gate.

The other ends of the rods $d\ d$ are secured to the post A', as seen in the drawings.

By this arrangement the gate is securely hinged to the post A'.

D represents an adjustable piece or gate, made as seen in the drawing, and sliding between the parallel bars of the main gate.

The upper and lower rails of the adjustable gate D are formed with holes $c\ c$, into which a pin may be inserted. This arrangement is intended for small animals to pass through.

A post may be inserted a little distance from the adjustable piece D, and, by removing the pin in the end of the rail, the gate D may be closed or opened at pleasure without interfering with the main gate.

Having thus described our invention,

What we claim as new, and desire to secure by Letters Patent, is—

The gates B D, plates $b\ b$, and rods $d\ d$, all constructed, arranged, and operating substantially as and for the purpose herein described.

In testimony that we claim the foregoing as our own, we affix our signatures, in presence of two witnesses.

GERSHOM MOTT.
JOSHUA MORRIS, JR.
DAVID LUPTON.

Witnesses:
JAMES ROSS,
RUTH W. BUNDY.